United States Patent [19]

Eames

[11] 4,176,374
[45] Nov. 27, 1979

[54] SENSITIVITY AND CALIBRATION CONTROL FOR TELEVISION CAMERA REGISTRATION SYSTEM

[75] Inventor: Fred M. Eames, Quincy, Ill.

[73] Assignee: Harris Corporation, Cleveland, Ohio

[21] Appl. No.: 790,033

[22] Filed: Apr. 22, 1977

[51] Int. Cl.² .............................................. H04N 9/16
[52] U.S. Cl. ........................................................ 358/51
[58] Field of Search ......................... 358/51, 209, 217; 315/9, 370, 399

[56] References Cited

U.S. PATENT DOCUMENTS

| | | | |
|---|---|---|---|
| 3,621,136 | 11/1971 | Stanwood | 358/227 |
| 3,764,735 | 10/1973 | Dieter-Schneider et al. | 358/51 |
| 3,830,959 | 8/1974 | Dischert et al. | 358/51 |
| 3,883,689 | 5/1975 | Mansour et al. | 358/227 |
| 3,925,812 | 12/1975 | Blom et al. | 358/51 |
| 4,053,203 | 10/1977 | Monahan | 358/51 |

Primary Examiner—John C. Martin

[57] ABSTRACT

An automatic registration system for color television cameras which includes a calibration control circuit and a detail recognition circuit. The system operates cyclically, in each cycle determining if two of the video signals are in registration. At the conclusion of each cycle, a registration control signal is changed in accordance with any misregistration detected. The calibration control circuit monitors the calibration of the system. If a miscalibration condition is detected, the system is locked into a calibration mode wherein the system is fully calibrated before the registration process is allowed to continue. The detail recognition circuit monitors the amount of detail in the video signals in each operating cycle, and prevents the registration control signal from changing at the conclusion of those operating cycles in which insufficient detail has existed upon which a reliable registration decision could be based.

4 Claims, 3 Drawing Figures

SENSITIVITY AND CALIBRATION CONTROL FOR TELEVISION CAMERA REGISTRATION SYSTEM

BACKGROUND AND FIELD OF THE INVENTION

The present invention relates to automatic registration of color television cameras, and more particularly to a system for controlling calibration and sensitivity in such automatic registration systems.

Color television cameras currently in use employ two or more image pick-up devices upon which the same scene is simultaneously focused. The occurrence of the video signals produced by these image pick-up devices must be synchronized so as to simultaneously convey information relating to the same portion of the focused image. This registration of the color video signals is generally accomplished by means of a registration circuit which detects errors in registration and automatically supplies control signals to readjust the registration accordingly.

These automatic registration circuits operate by detecting the occurrence of transitions in each of the video signals. Since the transitions correspond to transitions in brightness in the picture being imaged, similar transitions should occur simultaneously in all of the video signals. The registration control circuit supplies control signals which will cause corresponding transitions in the different video signals to occur simultaneously. The correct operation of these circuits is thus dependant upon the existance of such transitions (corresponding to detail in the picture being imaged) in the video signals. If the picture being imaged lacks sufficient picture detail, the automatic registration signal may wander from the correct setting; this may cause a complete loss of registration. In the past, manually operable switches have been provided which would be actuated by the camera operator to disable the operation of the automatic registration circuit when sufficient picture detail was lacking.

Automatic registration circuits are often designed to operate in a cyclical fashion, providing registration control of first one and then another of the color video signals in successive operating cycles. An operating cycle may also be included for automatically calibrating the operation of the registration control circuit, thereby preventing incorrect registration adjustment as a result of component variations, component aging, thermal effects, etc. Systems of this nature are disclosed in the patent to Dischert et al, U.S. Pat. No. 3,830,959 and the Monahan United States application Ser. No. 643,169, filed on Dec. 22, 1975, now U.S. Pat. No. 4,053,203. Since the registration system will not operate properly unless the system has been calibrated, it would be desirable to instead provide a system wherein calibration is automatically monitored and fully adjusted before registration of the video signals may proceed.

The present invention provides an automatic registration system which includes a sensitivity control for disabling the operation of the registration circuit automatically when insufficient picture detail exists. The system also includes means for determining when the system is not in calibration, and for locking the system in the calibration mode until calibration has been achieved.

In accordance with the present invention, a control circuit is provided for use in an automatic registration system which functions in cycles of operation and which provides registration control signals at the conclusion of each cycle of operation. A picture detail circuit is provided for determining the amount of picture detail existing during each cycle of operation and for enabling or disabling the response of the system to the registration control signal generated in that cycle of operation in accordance therewith. A calibration control circuit is provided for determining when a calibration error exists and for forcing the registration system to provide successive calibration cycles of operation until calibration has been achieved.

BRIEF DESCRIPTION OF THE DRAWINGS

The foregoing and other objects and advantages of the present invention will become more readily apparent from the following description of a preferred embodiment, as taken in conjunction with the accompanying drawings which are a part hereof, and wherein.

DETAILED DESCRIPTION OF THE DRAWINGS

Figure 1:
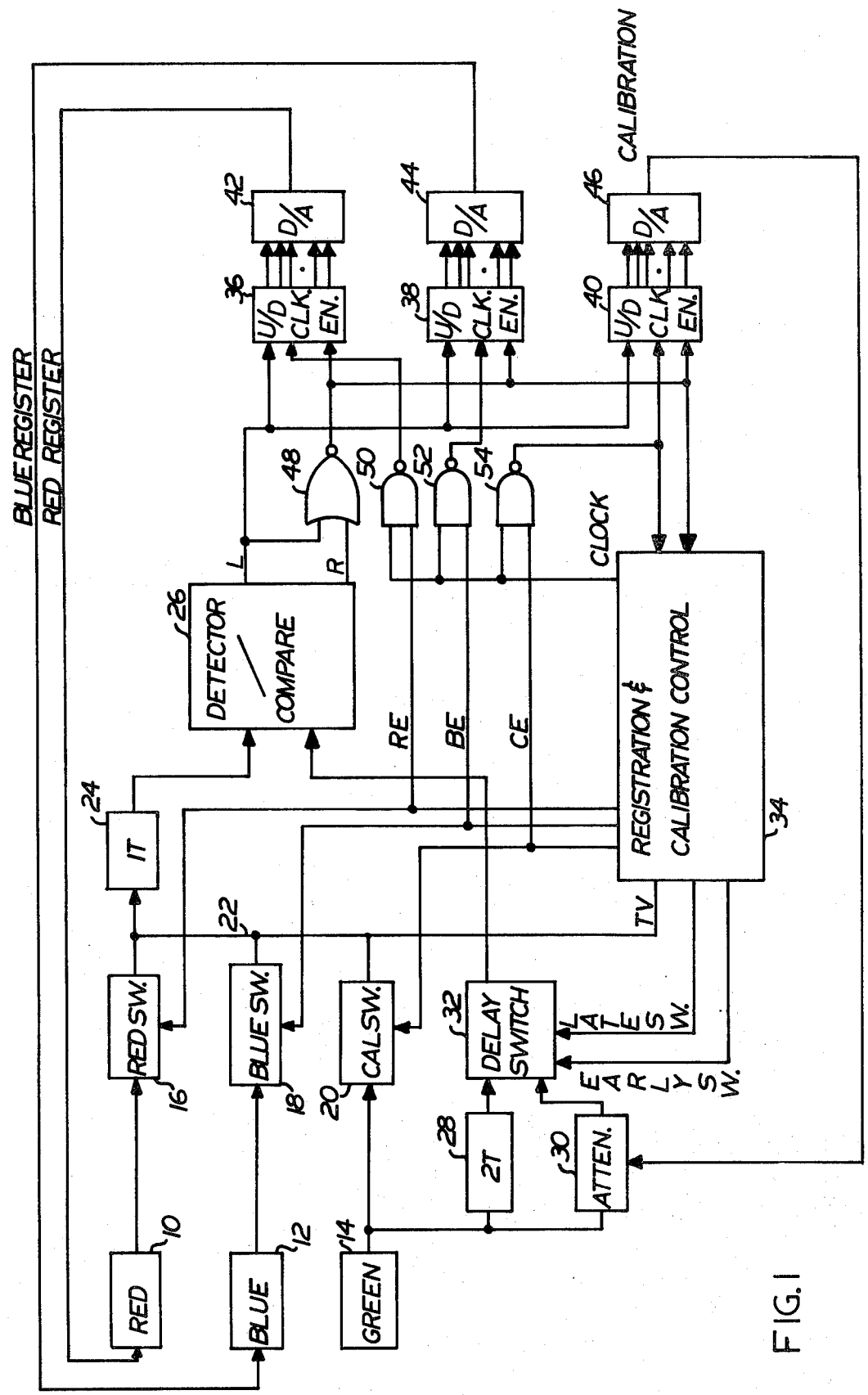
FIG. 1 is a general block diagram of an automatic registration system in which the present invention could conveniently find use.

There is shown in FIG. 1 a simplified schematic illustration of an automatic registration system in which the present invention could conveniently be used. A more detailed description of a system of this nature is provided in the aforementioned patent application to Monahan Ser. No. 643,169, filed on Dec. 22, 1975, now U.S. Pat. No. 4,053,203. Three video signal sources 10, 12, and 14 are provided which respectively provide video signals corresponding to the red, blue, and green color content of the picture being imaged by the television camera. These video signals are directed to corresponding switches 16, 18, and 20 which serve to selectively pass the corresponding video signal to a common output line 22. These switches are controlled by control signals RE, BE, and CE respectively so that one and only one of the video signals is applied to output line 22 at any given time. This output line 22 is directed to a delay circuit 24 which delays the input signal by a selected amount and provides that delayed video signal to a detector/comparator 26. The green video signal, in addition to being provided to switch 20, is also directed to a delay circuit 28 and an attenuation circuit 30. Delay circuit 28 is designed to provide exactly twice the delay provided by delay circuit 24. The outputs of delay circuit 28 and attenuator 30 are each directed to a delay switch 32 which serves to alternately gate one and then the other of these two signals to a second input of detector/comparator 26.

In the drawing, the green video signal is used as a reference signal, and the registration of the red and blue signal sources is controlled so as to correspond thereto. Three cycles of operation are provided, the first two corresponding respectively to a red registration cycle and a blue registration cycle, and the third corresponding to a calibration cycle wherein the calibration of the system is monitored and corrected.

Registration and calibration control circuit 34 serves to provide three signals RE, BE, and CE corresponding respectively to the red, blue, and calibration cycles of operation. In each cycle, delay switch 32 will be operated so that for the first half of the operating cycle the output of delay circuit 28 will be gated to detector/comparator 26, while for the second half of each cycle, the output of attenuator 30 will be gated to detector/comparator 26.

In accordance with NSTC color television broadcasting standards, video information corresponding to one complete picture, or "frame," will be generated in two separate fields. In the first, or "A" field is conveyed video information corresponding to alternate lines of the subsequently displayed image. The second, or "B" field includes information corresponding to the alternate lines which were not included in the first field. The subsequently displayed picture will be produced by interlacing the lines of the two fields into a single picture.

The registration cycles will be synchronized with the timing of the video signal sources so that each cycle of operation corresponds to a single frame of the picture being imaged. The first and second halves of each cycle of operation will thus correspond to the "A" and "B" fields which will be interlaced to make up the single picture frame.

In red and blue cycles of operation, detector/comparator 26 determines the amount of misregistration between the green video signal and the test video signal being gated to delay circuit 24. If the test video signal is in registration with the green video signal, then the L and R outputs of detector/comparator 26 will both be at a low logic at the conclusion of the cycle. If, however, the test video is misregistered to the left or right of the green video signal, then the L or R output, respectively, will be a high logic level. The manner in which the L and R output signals are developed may be more readily understood through reference to the aforementioned Monahan patent application.

In the calibration cycle, switch 20 is actuated so that the green video signal is supplied to delay circuit 24. Since the green signal will obviously be in registration with itself, the L and R output of detector/comparator 26 will indicate the calibration of the unit, rather than misregistration.

The L and R outputs of detector/comparator 26 are used to generate commands to digital counters 36, 38, and 40. Counters 36 and 38 each store a count indicating the level of a registration control signal to be supplied to red and blue video signals 10 and 12 by corresponding digital-to-analog convertors 42 and 44. Counter 40, on the other hand, stores a count indicating the level of a calibration control signal to be supplied to voltage-controlled attenuator circuit 30 by a digital-to-analog convertor 46. The outputs of detector/comparator 26 will both be at a low logic level when no misregistration exists, however, either the left or the right output will shift to a high logic level when a left or right misregistration condition has been detected. The L and R outputs are directed to a NOR gate 48 which will provide a low output signal whenever either is at a high logic level, indicating that a misregistration or miscalibration condition exists. The output of NOR gate 48 is directed to the ENABLE inputs of counters 36, 38, and 40 and will enable the counters to respond to clock pulses supplied by clock gates 50, 52, and 54 only when a misregistration or miscalibration condition exists. The L output of detector/comparator 26 is directed to the up/down inputs to the counters and indicates the direction in which the count stored therein must be changed so as to correct the misregistration or miscalibration error.

NAND gates 50, 52, and 54 are enabled by the RE, BE, and CE outputs of control circuit 34 so that each will be enabled only when the corresponding video switch is activated. For example, in an operating cycle when red switch 16 is actuated by the RE output of the control circuit 34, the RE output will also serve to activate NAND gate 50 so that the clock pulses supplied by control circuit 34 will be gated to counter 36. In this manner, only the appropriate counter 36, 38, or 40 will respond to the clock pulse supplied by registration and calibration control circuit 34 at the conclusion of each operating cycle.

Figure 2:
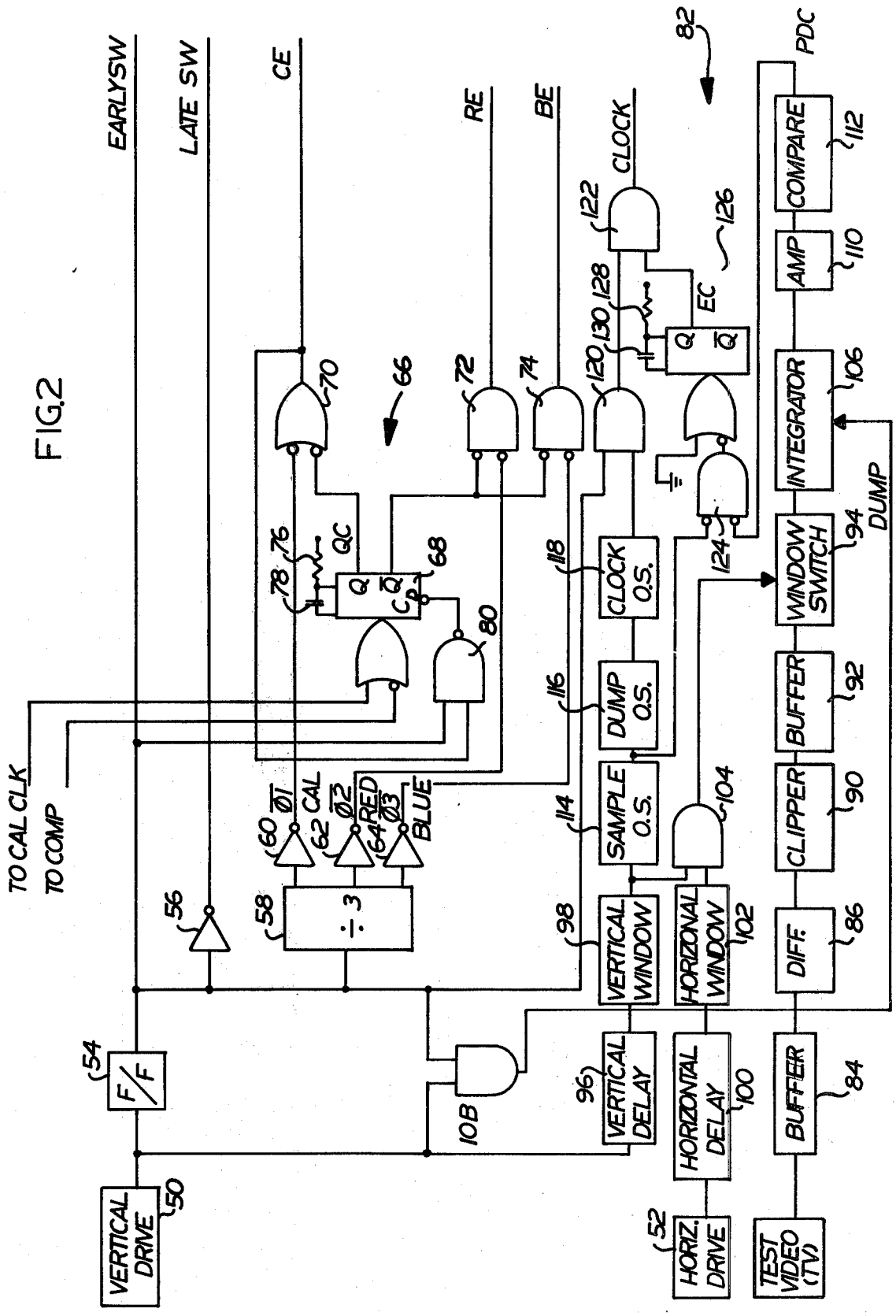
FIG. 2 is a schematic illustration of a registration control system in accordance with the present invention; and, FIG. 3 is a timing diagram illustrating the operation of the control circuit of FIG. 2.
Figure 3:
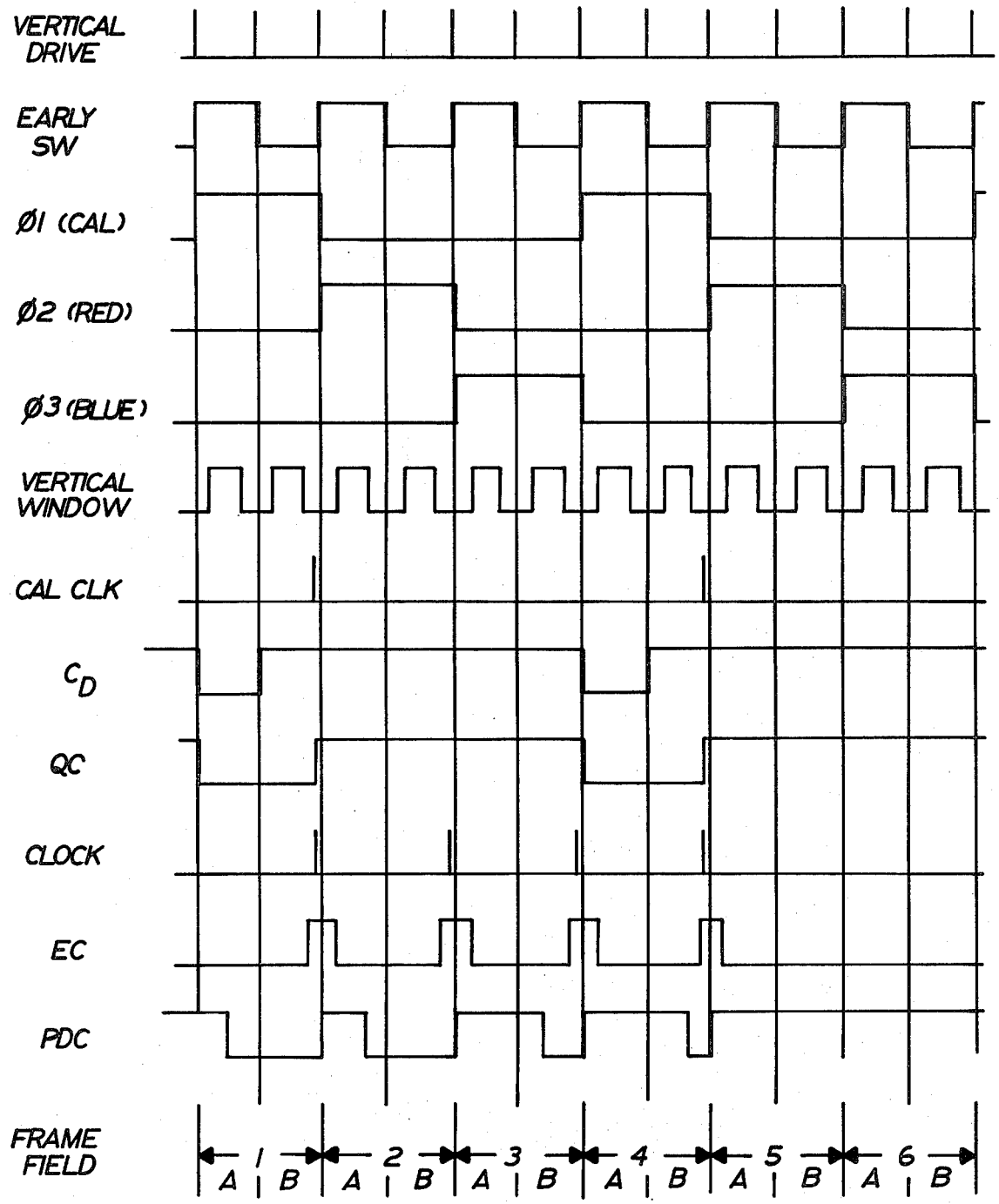

Referring now to FIG. 2, a registration and calibration control circuit in accordance with the present invention is provided. The following description of the circuitry provided in FIG. 2 may be more readily understood through reference to the timing diagrams of FIG. 3. The timing diagrams of FIG. 3 will not be described separately.

The circuit illustrated in FIG. 2 controls the timing of the automatic centering circuit, and is responsive to a vertical drive signal 50 and a horizontal drive signal 52 to provide this timing. The vertical and horizontal drive signals are used in the camera to control the scanning of the optical imaging tubes. These drive signals are composed of periodic sequences of pulses having repetition rates corresponding to the vertical and horizontal scanning rates of the television camera.

As mentioned previously, the video signals supplied by a television camera are supplied in frames, each including two fields. A single field corresponds to the interval between vertical drive pulses. The vertical drive signal is fed into a flip-flop 54 which responds to consecutive vertical drive pulses by changing its output from one digital state to another. Flip-flop 54 therefore provides a square wave output signal which is high for one field of each frame, and low for the alternate field in each frame. This signal thus indicates the field then being produced by the video camera. This signal and its inverse are directed to the delay switch 32 (FIG. 1) for purposes of controlling the supply of the delayed signal and the attenuated signal respectively provided by delay circuit 28 and attenuator circuit 30.

A divide-by-three circuit 58 responds to the output of flip-flop 54 to alternately energize one of three output lines in accordance therewith. This divide-by-three circuit triggers on the leading edge of each of the square wave pulses provided by flip-flop 54. Each of the three outputs of divide-by-three circuit 58 will therefore be at a high logic level for one out of every three frames. These signals are used for determining the normal sequence of operating cycles. Inverters 60, 62, and 64 are provided for inverting these signals to provide output signals having the opposite logic sense of the signal supplied thereto.

The present invention provides a calibration control circuit, generally indicated by reference number 66, to which the outputs of these three inverters are directed. Calibration control circuit 66 includes a monostable 68 which must be triggered in order for the RE, BE, and CE operating cycle control signals to follow the sequence determined by divide-by-three circuit 58. The gating of these signals is accomplished by logic gates 70, 72, and 74. When monostable 68 has been triggered, the Q output thereof (QC) will be at a high logic level. This will enable the output of logic gate 70 to respond to the output signal supplied by inverter 60, while supplying an incidental inversion thereto. Since the $\overline{Q}$ output of monostable 68 will be at a low logic level when triggered, gates 72 and 74 will be enabled to gate the signal supplied by the corresponding inverters 62 and 64, while also providing an incidental inversion thereto. The normal sequence of operating cycles will therefore be produced.

If monostable 68 has not been triggered, however, the Q output thereof will remain in a low logic level, thus forcing the CE output of gate 70 to a continuous high logic level. Moreover, the $\overline{Q}$ output of monostable 68 will force the outputs of gates 72 and 74 to a continuous low logic level. Since the output of logic gate 70 is used to control the calibration cycle of the automatic centering circuit, the automatic registration system will continuously remain in the calibration mode.

The triggering of monostable 68 is controlled by two inputs thereto which are derived from the output of the comparator logic gate 48, shown in FIG. 1, and the output of the calibration clock gate 54, also shown in FIG. 1. Monostable 68 will normally be triggered by the calibration clock signal supplied by calibration clock gate 54 at the conclusion of the calibration cycle of operation. When the output of comparator logic gate 48 is at a low logic level, however, indicating that the circuit is not in calibration at the conclusion of the calibration cycle, monostable 68 will not be triggered by the calibration clock signal and the calibration cycle will continue. At some point, however, calibration will again be achieved, and the output of logic gate 48 will return to a high logic level. When this occurs, the next calibration clock pulse supplied by logic gate 54 will cause the triggering of monostable 68, thereby causing the circuit to re-enter its normal cyclical mode of operation.

Monostable 68 has a timing resistor 76 and a timing capacitor 78 which are selected so as to provide an output pulse having a duration of at least six fields (i.e., three frames). Consequently, the output of monostable 68 would remain high from one calibration cycle through till the end of the next calibration cycle unless reset. Monostable 68 will be reset, however, during the first field of the calibration cycle. A logic gate 80 provides this function by logically ANDing the output of flip-flop 54 and the CE output of logic gate 70. The output of logic gate 80 will shift to a low logic level at the appropriate time and will thus force the resetting of monostable 68. This will insure that monostable 68 will not respond to signals supplied at the trigger inputs thereto during the first field of the calibration cycle.

The present invention also contemplates the inclusion of a detail recognition circuit, generally indicated by reference number 82. This circuit determines the amount of picture detail present in each frame of video information, and disables the supply of a clock pulse at the conclusion of each frame when insufficient detail exists. Because of this, the registration process will only take place when sufficient picture detail exists upon which detector/comparator 26 may base a registration decision.

The amount of detail in the picture is determined by monitoring the test video signals supplied on line 22 (FIG. 1). This signal is directed to a buffer circuit 84 and then to a differentiation circuit 86. Differentiation circuit 86 serves to differentiate the video signals so as to provide an output signal containing only edge, or detail, information. Differentiator 86 is followed by a clipping circuit 90 which clips the negative portion of the signal therefrom so that only positive pulses appear at the output of clipper 90. The output of clipper 90 is then directed to a window switch 94 via a buffer circuit 82.

Window switch 94 serves to selectively pass only those signals corresponding to the center portion of the picture being imaged. The window signal which controls the operation of window switch 94 is derived by four one-shots 96, 98, 100, and 102 in conjunction with an AND gate 104. Vertical delay one-shot 96 responds to the vertical drive pulse supplied by circuit 50 to generate a pulse which delays the actuation of a second, vertical window one-shot 98 so that the pulse supplied by vertical window one-shot 98 occurs during the center picture portion between vertical drive pulses. Horizontal delay one-shot 100 serves the similar purpose of delaying the actuation of horizontal window one-shot 102 in response to horizontal drive pulses provided by the horizontal drive circuit 52. The outputs of the vertical window one-shot and horizontal window one-shot are logically combined by an AND gate 104 to provide the control signal which controls the operation of window switch 94. Window switch 94 may be a conventional analog switch comprising a field effect transistor and associated gating circuitry.

The differentiated and clipped signal, as gated by window switch 94, is directed to an integrator 106 which accumulates the signals supplied thereto so as to provide an output signal indicative of the total amount of picture detail in any single picture frame. Integrator 106 is reset at the beginning of every frame by means of a dump signal supplied by a logic gate 108. This gate serves to logically combine the output of the vertical drive circuitry 50 and the output of flip-flop 54. The output of logic gate 108 thus comprises a single pulse occurring at the beginning of each frame. The output of integrator 106 is directed through another buffer amplifier 110 to a comparator circuit 112 which serves to compare the amplitude of the integrated signal with a selected amplitude so as to provide a hard decision regarding the presence or absence of sufficient picture detail in a given frame. If the magnitude of the signal supplied by amplifier 110 is above a preselected level, the output of comparator 112 will be at a low logic level. If the output of amplifier 110 is below this minimum aplitude, however, the output of comparator 112 will remain at a high logic level, thereby disabling the clock pulse through circuitry which will be described.

The amount of detail necessary to cause comparator 112 to change output states, i.e., the sensitivity of the detail recognition circuit, may be manually adjusted by varying the clipping level, as illustrated. A potentiometer could be provided for this purpose. The sensitivity could also be varied in any number of other ways, as, for example, by changing the gain of amplifier 110 or the preselected comparison level of comparator 112.

A clock pulse is derived near the conclusion of each frame by means of a series of one-shots 114, 116, and 118. At the conclusion of the vertical window pulse supplied by vertical window one-shot 98, one-shots 114, 116, and 118 will activate in sequence so as to provide a clock pulse to a logic gate 120. Since a clock pulse will be supplied by this series of one-shots at the conclusion of each field, gate 120 is provided to logically combine this clock pulse with the output of flip-flop 54 so as to select the pulse occurring in the second field of each frame. The output of logic gate 120 thus comprises a pulse which occurs a brief time following the vertical window in the second field of each frame. An additional logic gate 122 is then provided for gating this signal in accordance with the status of a monostable 126. Unless monostable 126 has been triggered, the clock pulse will not be gated by clock gate 122. Monostable 126 will be triggered whenever the output of logic gate 124 makes a transition from a high logic level to a low logic level. This, in turn, will only occur when the output of comparator 112 is at a low logic level at the time when the pulse provided by sample one-shot 114 occurs. If the output of comparator 112 is at a high logic level at that time, monostable 126 will not be triggered and gate 122 will block the clock pulse.

In summary then, the integrator 106 will integrate the amount of detail in each frame during the window portion of the two fields thereof. At the conclusion of the vertical window in the second field of each frame, a sample one-shot 114 will trigger, causing the triggering of a monostable 126 if comparator 112 indicates that adequate picture detail has existed during the preceeding frame. If monostable 126 is triggered, the output thereof will shift to a high logic level. The timing resistor 128 and timing capacitor 130 of monostable 126 are selected so that the pulse generated by monostable 126 will last for a duration sufficient to enable the clock pulse supplied by clock one-shot 118 to be gated to logic gate 122. If comparator 112 is at a high logic level, however, indicating that the frame has inadequate picture detail upon which to base a reliable decision regarding registration, then monostable 126 will not be triggered by the output of sample one-shot 114 and gate 122 will block the passage of the clock signal to up/down counters 36, 38, and 40 (FIG. 1). In this fashion, registration will only be adjusted in those frames when adequate picture detail exists. It will be appreciated that, in any event, detector/comparator 26 will in each cycle provide an output signal indicative of whether or not a registration condition exists. The registration control circuit 82 will merely determine whether or not sufficient picture detail exists in that cycle for this decision to be reliable. Since this occurs every frame, and refers to only the immediate frame, no registration information is lost unnecessarily, but only reliable decisions are used to adjust registration.

The system illustrated in FIG. 1 may provide either vertical or horizontal centering, depending upon the magnitudes of delays 24 and 28. Therefore, a television centering system will usually include two circuits of this type with delays scaled to provide both vertical and horizontal registration. Although a system of this sort could include separate registration and calibration controls for each registration circuit, generally, a single registration and calibration control will be provided for jointly controlling both circuits.

Although the invention has been described with respect to a preferred embodiment, it will be appreciated that various re-arrangements and alterations of parts may be made without departing from the spirit and scope of the invention as defined in the appended claims.

What is claimed is:

1. Sensitivity control apparatus for use in an automatic registration system which cyclically registers at least two video signals by in each operating cycle deriving a misregistration signal indicative of misregistration between the two signals and, at the conclusion of each cycle, changing a registration control signal in accordance with said misregistration signal, said apparatus comprising means for, in each operating cycle, determining the reliablity of the misregistration signal derived during that operating cycle, and means for preventing said misregistration signal from changing said registration control signal at the conclusion of operating cycles in which said misregistration signal is determined to be unreliable.

2. Sensitivity control apparatus as set forth in claim 1, wherein said means for determining the reliability of said misregistration signal derived in each operating cycle comprises detail recognition means for, in each cycle, determining the cumulative amount of detail included in said video signals over only a selected portion of said operating cycle, and comparator means for comparing said amount of detail with a preselected level so as to thereby provide a comparator output signal indicative of the reliability of said misregistration detection.

3. Sensitivity control apparatus as set forth in claim 2, wherein said detail recognition means comprises differentiating means responsive to at least one of said video signals for differentiating said signals to provide a differentiated signal, clipping means responsive to said differentiated signal to provide a clipped signal, and integrator means for integrating said clipped signal over only a selected portion of each operating cycle to thereby provide a signal indicative of the cumulative amount of detail included in said video signals over at least said selected portion of said operating cycle.

4. Calibration control apparatus for use in an automatic registration system which cyclically registers at least two video signals by in each registration cycle detecting misregistration between the two signals and changing a registration control signal in accordance therewith, said registration system also including a periodic calibration cycle for monitoring the calibration of said system and for incrementally changing a calibration control signal in accordance therewith, said calibration control apparatus comprising means for detecting when said system is miscalibrated and, means for causing said system to provide successive calibration cycles unless said system is calibrated whereby said registration cycles only occur when said system is calibrated.

* * * * *